United States Patent
Humphreys et al.

(10) Patent No.: US 9,053,450 B2
(45) Date of Patent: Jun. 9, 2015

(54) AUTOMATED BUSINESS PROCESS MODELING

(71) Applicant: International Business Machines Corporation, Armonk, NY (US)

(72) Inventors: Andrew D. Humphreys, Emsworth (GB); John J. P. Mcnamara, Winchester (GB); John D. Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/941,872

(22) Filed: Jul. 15, 2013

(65) Prior Publication Data

US 2013/0304668 A1 Nov. 14, 2013

Related U.S. Application Data

(63) Continuation of application No. 13/118,733, filed on May 31, 2011, now Pat. No. 8,521,762.

(51) Int. Cl.
*G06F 17/30* (2006.01)
*G06Q 10/06* (2012.01)

(52) U.S. Cl.
CPC ........ *G06Q 10/067* (2013.01); *G06F 17/30663* (2013.01)

(58) Field of Classification Search
None
See application file for complete search history.

(56) References Cited

U.S. PATENT DOCUMENTS

| | | | |
|---|---|---|---|
| 7,657,411 B2 | 2/2010 | Poetsch | |
| 7,831,453 B2 | 11/2010 | Das | |
| 2005/0086256 A1 | 4/2005 | Owens | |
| 2007/0179828 A1 | 8/2007 | Elkin | |
| 2008/0133510 A1 | 6/2008 | Timmons | |
| 2008/0147642 A1* | 6/2008 | Leffingwell et al. | 707/5 |
| 2009/0063225 A1 | 3/2009 | Baeyens et al. | |
| 2009/0112916 A1 | 4/2009 | Stuhec | |
| 2009/0132528 A1 | 5/2009 | Albornoz et al. | |
| 2010/0082331 A1 | 4/2010 | Brun et al. | |
| 2010/0235839 A1 | 9/2010 | Hu et al. | |
| 2011/0225155 A1* | 9/2011 | Roulland et al. | 707/737 |
| 2011/0271232 A1 | 11/2011 | Crochet et al. | |

(Continued)

FOREIGN PATENT DOCUMENTS

JP 2009037601 2/2009

OTHER PUBLICATIONS

IBM, "Importing a Microsoft Word document into RequisitePro," Printed Mar. 22, 2012, Copyright IBM, <http://www-01.ibm.com/support/docview.wss?uid=swg21135529>.

(Continued)

*Primary Examiner* — Wilson Lee
(74) *Attorney, Agent, or Firm* — Nicholas L. Cadmus

(57) ABSTRACT

In a method for generating a business process model project, a computer receives a data file comprising text, descriptive of a business process. The computer searches a sentence in the text for a keyword indicative of existence of a corresponding business artifact stated elsewhere in the sentence. In response, the computer identifies an indicator in the sentence, the indicator designating a name of the corresponding business artifact. The computer identifies a business artifact based on the keyword and the indicator. The computer generates a business process model project based in part on the business artifact.

6 Claims, 6 Drawing Sheets

(56) References Cited

U.S. PATENT DOCUMENTS

2012/0158849 A1 6/2012 Yoakum et al.
2012/0310962 A1 12/2012 Humphreys et al.

OTHER PUBLICATIONS

IBM, "Rational RequisitePro—Features and benefits," Printed Mar. 22, 2012 <http://www-01.ibm.com/software/awdtools/reqpro/features/?S_CMP=rnav>.

IBM, SPSS software for predictive analytics, Predictive approach to policing offers deep insight into crime data; Printed Mar. 22, 2012, <http://www-01.ibm.com/software/analytics/spss/?pgel=ibmhzn&cm_re=masthead-_-products-_-swspss>.

Infonic, "Infonic—Information where you are—Sentiment," Printed Mar. 23, 2012, Copyright 2011 Infonic <http://web.archive.org/web/20110713032051/http://www.infonic.com/product_sentiment.php>.

Zou, "Improving the Usability of e-Commerce Applications Using Business Processes", IEEE Transactions on Software Engineering, vol. 33, No. 12, pp. 837-855, Dec. 2007.

Office Action, Notification date Feb. 4, 2013, U.S. Appl. No. 13/118,733.

Response to Office Action with Notification date Feb. 4, 2013 filed Mar. 27, 2013, U.S. Appl. No. 13/118,733.

* cited by examiner

AUTOMATED BUSINESS PROCESS MODELING

CROSS REFERENCE TO RELATED APPLICATION

This application is a continuation of U.S. patent application Ser. No. 13/118,733 filed May 31, 2011 the entire content and disclosure of which is incorporated herein by reference.

FIELD OF THE INVENTION

The present invention relates generally to business process modeling, and more specifically to automated business process modeling.

BACKGROUND

Before a technical professional may proceed with implementing a new system for implementing a business process, business requirements for the system generated by a business professional must be translated into technical requirements. This can be challenging because business professionals are generally not technically skilled, while technical professionals are generally not skilled in business processes.

Known business process modeling (BPM) tools, such as IBM Rational® Systems Architect® program tool, help bridge the divide between business professionals and technical professionals by translating a business process model into technical requirements. A business professional commonly defines a business process as text using a word processor, such as the Microsoft® Word program. A known BPM tool, such as the IBM Rational® Systems Architect® program tool, however, requires a user to manually create a business model using the BPM tool, based on the business process already defined as text in the word processor document. For example, a known BPM tool requires a user to manually create BPM model artifacts, such as activities, resources, and decisions, using the known BPM tool, based on the artifacts already defined as text in the word processor document. This is time consuming and error prone, however, because a business user is generally not proficient with the relatively complex and technical business processes modeling tool.

SUMMARY

In a first embodiment of the present invention, there is a system and method for transforming a business model description into business process model artifacts. A computer receives a data file comprising text, descriptive of a business process. The computer searches a sentence in the text for a keyword indicative of existence of a corresponding business artifact stated elsewhere in the sentence. In response, the computer identifies an indicator in the sentence, the indicator designating a name of the corresponding business artifact. The computer identifies a business artifact based on the keyword and the indicator. The computer generates a business process model project based in part on the business artifact.

In a second embodiment of the present invention, there is a method for transforming a business model description into a business process model artifact. A computer receives a data file comprising text descriptive of a business process. The computer searches a sentence in the text for a keyword indicative of existence of a corresponding business artifact stated elsewhere in the sentence. In response, the computer identifies an indicator in the sentence, the indicator designating a name of the corresponding business artifact. The computer identifies a business artifact based on the keyword and the indicator. The computer adds the identified business artifact to a business artifact list

DETAILED DESCRIPTION

Figure 1:
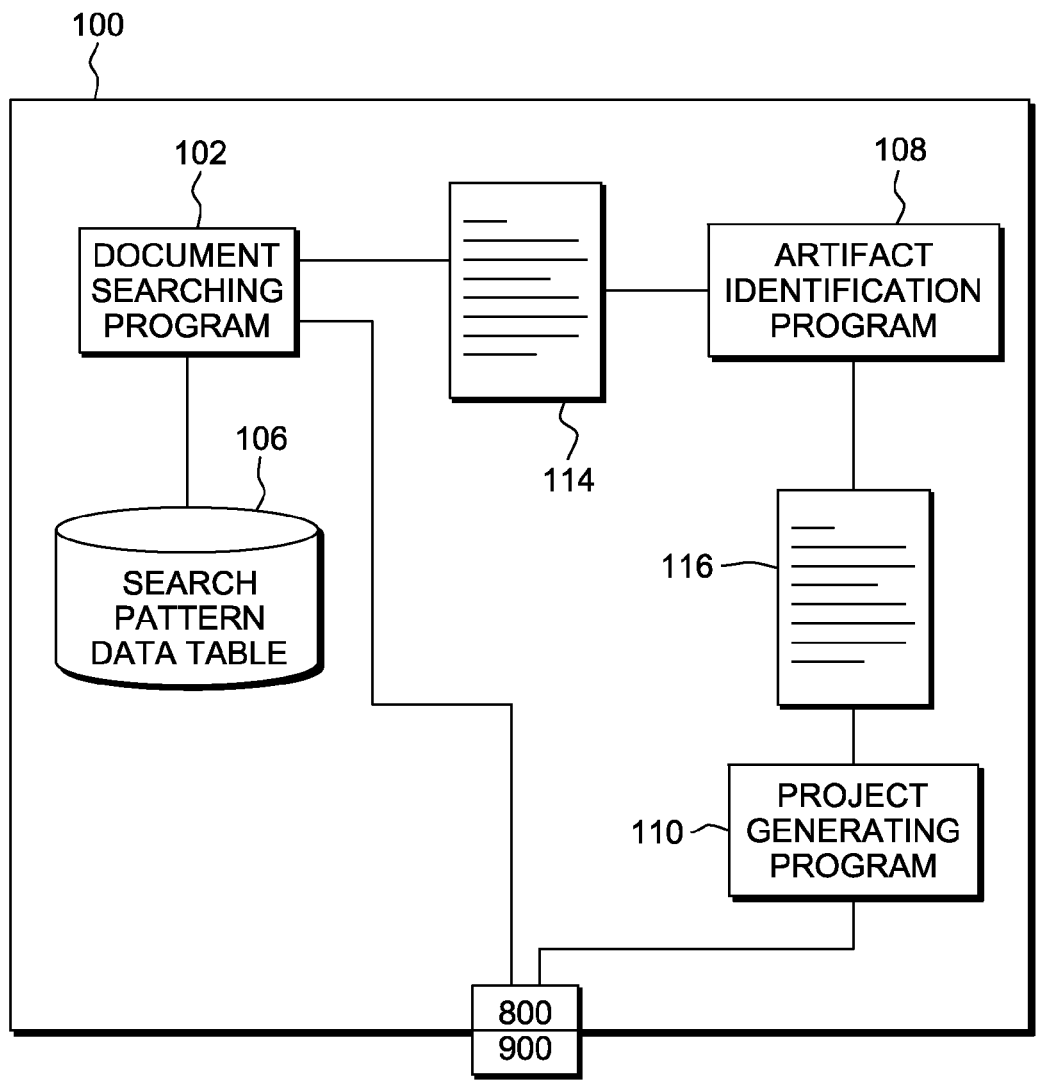
FIG. 1 illustrates a computer system for translating a business model description into business process model artifacts, according to one embodiment of the present invention.

The present invention will now be described with reference to the figures. FIG. 1 illustrates a computer system 100 for translating a business model description into business process model (BPM) artifacts, according to one embodiment of the present invention. Computer system 100 includes a document searching program 102 for receiving and searching an electronic document. The document can be a Microsoft® Word document, a text document generated by another type of word processor, or other similar document comprising text, describing a business process. Document searching program 102 searches the document to identify sentences containing key characters, words, or phrases according to a predefined search pattern. The predefined search pattern, including the key characters, words, or phrases, are stored in search pattern data table 106. Search patterns may be pre-defined in search pattern data table 106 by a systems administrator or another similar type of user. A processing list 114 stores the sentences, identified by the document searching program 102, for processing. Processing list 114 can be stored in a data table, an electronic file such as a text file, or in memory.

Computer system 100 includes an artifact identification program 108 for parsing the identified sentences and identifying BPM artifacts based on the predefined search pattern. For example, an identified sentence may contain a keyword specifying a type of artifact and indicating that a name of a corresponding BPM artifact appears elsewhere in the sentence. Types of BPM artifacts include activities, resources, and decision points, and these terms can serve as the keywords. An artifact list 116 stores the names of the corresponding BPM artifacts identified by the artifact identification program from the identified sentences.

Computer system 100 includes a project generating program 110 to generate a BPM project, based in part on the identified BPM artifacts, as explained in more detail below. For example, project generating program 110 may generate a zip file, an FDL file, an XML file, or other similar type of file, compatible with IBM Rational® Systems Architect®. A user loads the BPM project into an existing or new BPM tool to create a BPM.

Figure 2:
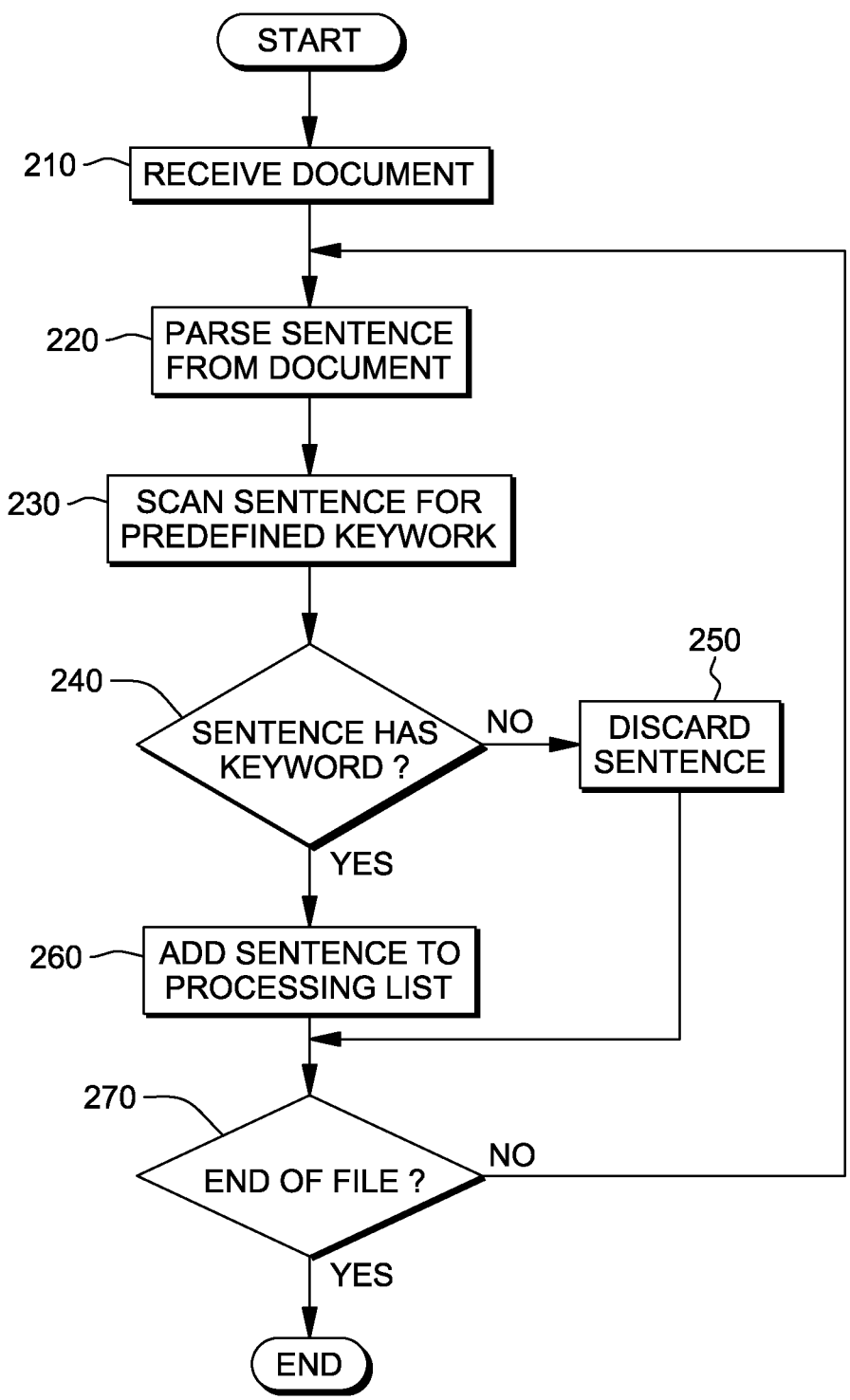
FIG. 2 illustrates in more detail the steps performed by a document searching program of the computer system of FIG. 1 for identifying specific characters, words, or phrases according to a predefined search pattern, according to one embodiment of the present invention.

FIG. 2 illustrates in more detail the steps performed by the document searching program 102 of FIG. 1 for identifying sentences of an electronic document containing specific characters, words, or phrases according to a predefined search pattern stored in search pattern data table 106, according to one embodiment of the present invention. At step 210, document searching program 102 receives a document containing text descriptive of a business process. At step 220, document searching program 102 parses out a sentence from the text of the document. A sentence comprises a string of text characters followed by an end-of-sentence indicator such as a period (.), a question mark (?), or an exclamation point (!). Thus, document searching program 102 reads the text until an end-of-sentence indicator is found.

At step 230, document searching program 102 searches the parsed sentence for one of several predefined keywords or phrases. The predefined keywords or phrases include types of BPM artifacts. For example, keywords may include "activity," "decision," and "resource."

It should be understood that predefined keywords may be stored in an external database, such as search pattern data table 106, or other similar electronic storage file. Accordingly, a systems administrator may define the keywords and modify the keywords as necessary.

At step 240, document searching program 102 determines whether the sentence includes a keyword. If document searching program 102 determines that the sentence does not include a keyword (decision 240, no branch), document searching program 102 discards the sentence at step 250. If, however, document searching program 102 determines that the sentence includes a keyword (decision 240, yes branch), document searching program 102 adds the sentence to processing list 114 for further processing, at step 260.

At step 270, document searching program 102 determines if an end of the document has been reached. If document searching program 102 determines that an end of the document has not yet been reached (decision 270, no branch), document searching program 102 parses out the next sentence, at step 220, and repeats the process described until all sentences of the text in the document have been parsed and searches for keywords.

Although document searching program 102 has been described as processing each sentence as it is read from the document, it should be appreciated that document searching program 102 may, alternatively, search the entire document and parse out each sentence first before beginning to process the sentences.

Figure 3:
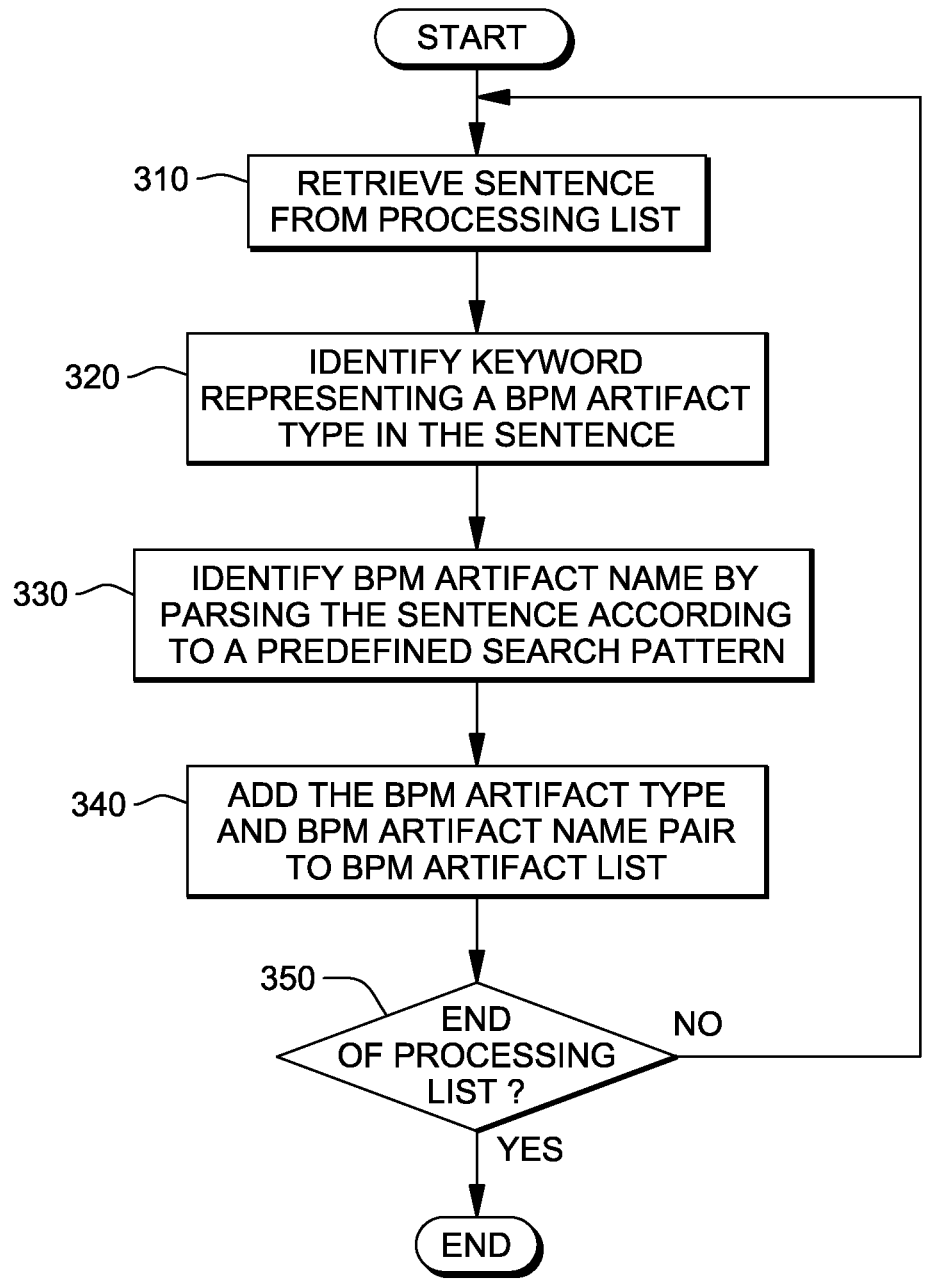
FIG. 3 illustrates in more detail the steps performed by an artifact identification program of the computer system of FIG. 1 for generating business process model artifacts, according to one embodiment of the present invention.

FIG. 3 illustrates in more detail the steps performed by the artifact identification program 108 of FIG. 1 for identifying BPM artifacts, according to one embodiment of the present invention. At step 310, artifact identification program 108 retrieves a sentence from processing list 114. At step 320, artifact identification program 108 identifies in the sentence a keyword, listed in search pattern data table 114, describing a type of BPM artifact to be defined in the sentence. Types of artifacts include activity artifact, decision artifact, and resource artifact. Artifacts may be identified in the sentence by the same names, i.e., "activity", "decision" and "resource". Alternatively, artifacts may identified by slightly different names in the sentence such as task, question, and employee, respectively. These artifact indicators are listed in search pattern data table 106. The search pattern data table 106 also indicates how the name of the corresponding artifact is designated in the sentence which includes the artifact indicator. For example, an activity artifact may be indicated by the term "task" in a sentence, and the search pattern data table 106 may indicate that another term in quotations in the same sentence is the name of the task artifact. In this example, a sentence may include the text "a task to "process credit card" . . . " where the keyword "task" indicates the presence of a "task" artifact in the sentence, and the name of the task artifact in this case is "process credit card" because it appears in quotes.

At step 330, artifact identification program 108 identifies a BPM artifact name by parsing the sentence according to predefined search pattern. For example, a search pattern may specify that the name of the artifact should appear within quotation marks, at some point in the sentence after the keyword, but not necessarily immediately following the keyword. Thus, according to the search pattern, artifact program 108 reads the sentence and searches for a first quotation mark after the identified keyword. After artifact identification program 108 finds the first quotation mark, artifact program 108 reads in text until reaching a second quotation mark. Artifact identification program 108 then identifies the read text (between the quotes) as the name of the artifact. For example, a sentence may include the text ". . . an activity called "process invoice" . . . " Artifact identification program 108 would process this sentence and determine that an activity artifact called "process invoice" is being defined in the document. It should be understood that other parsing rules may be defined and used to identify BPM artifacts in a sentence. For example, a BPM artifact name may be identified by capital letters, bold font, parenthesis, brackets, or other similar types of identifiers.

At step 340, artifact identification program 108 stores the identified BPM artifact type and the identified BPM artifact name as a pair in BPM artifact list 116. For example, using the above sample sentence, artifact identification program 108 add "BPM activity artifact—Process invoice" to activity list 116. Activity list 116 will later be used to populate a BPM project.

At step 350, artifact identification program 108 determines whether the end of the processing list 114 has been reached. If artifact identification program 108 determines the end of processing list 114 has not yet been reached (decision 350, no branch), then artifact identification program 108 retrieves the next sentence in processing list 114 at step 310, and repeats the process described until all sentences in processing list 114 have been processed.

It should be understood that a parsing rule may be stored in an external database or other similar electronic storage file. Accordingly, a systems administrator may define the parsing rule and modify the parsing rule as necessary.

Figure 4:
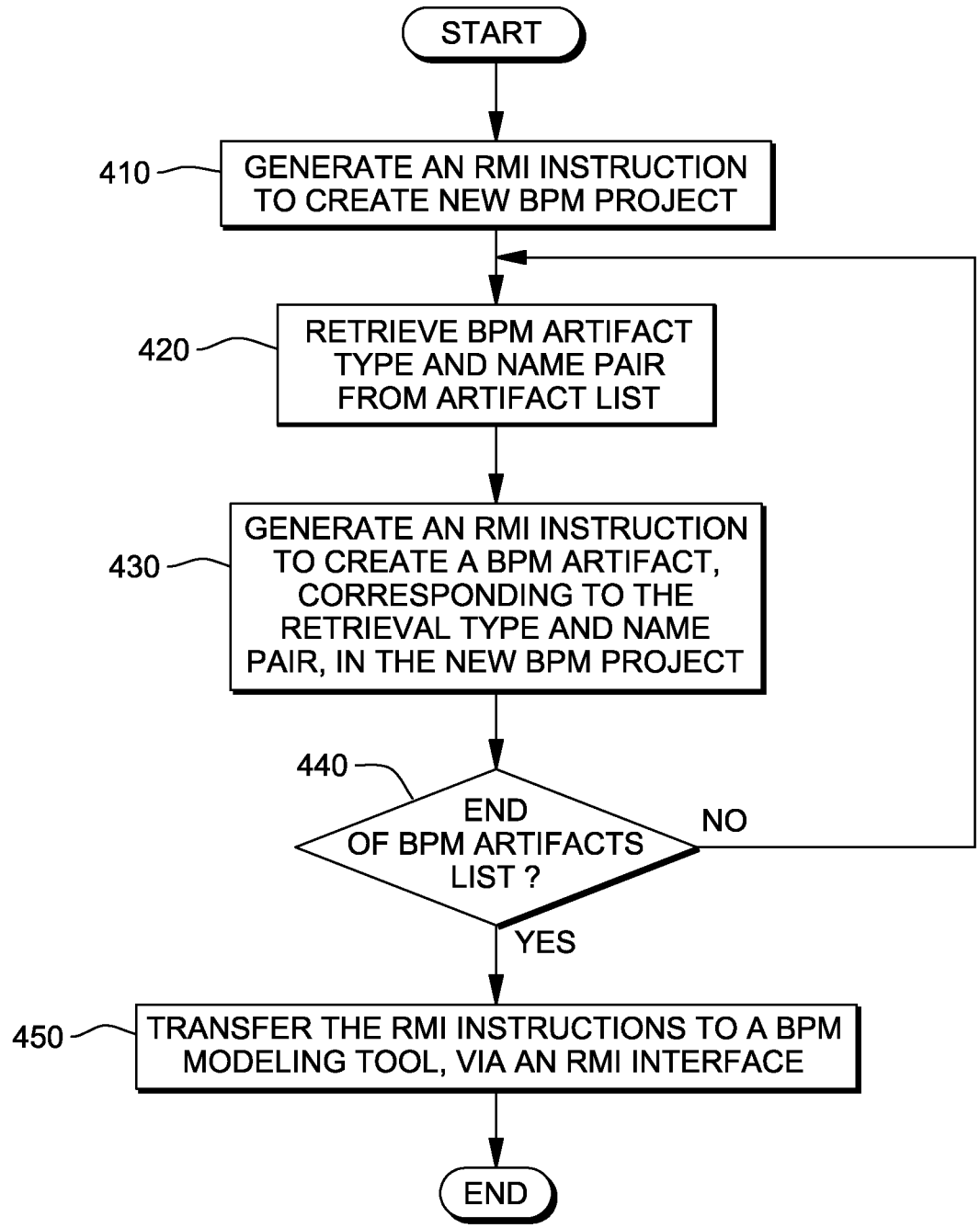
FIG. 4 illustrates in more detail the steps performed by a project generating program of the computer system of FIG. 1 for generating a business process model project, including generated business process model artifacts, according to one embodiment of the present invention.

FIG. 4 illustrates in more detail the steps performed by the project generating program 110 of FIG. 1 for generating a BPM project, including the identified BPM artifacts, according to one embodiment of the present invention. Specifically, FIG. 4 illustrates a flow chart of the project generating program 110 of FIG. 1 for generating a BPM project via a Remote Method Invocation (RMI) interface. An RMI interface allows a first application to interact with a second application by providing a common instruction base that can be generated by the first application and executed by the second application.

At step 410, project generating program 110 generates an RMI instruction to create a new BPM project. At step 420, project generating program 110 retrieves a BMP artifact type and BPM artifact name pair from artifact list 116. At step 430, project generating program 110 generates an RMI instruction to create an artifact in the BPM project, wherein the BPM artifact corresponds to the retrieved type and name.

At step 440, project generating program 110 determines whether the end of artifact list 116 has been reached. If project generating program 110 determines that the end of artifact list 116 has not yet been reached (decision 440, no branch), project generating program 110 retrieves the next BPM artifact type and name pair at step 420, and repeats the process described until all BPM artifact type and name pairs in BPM artifact list 116 have been processed.

In an example embodiment, the RMI instructions to create the BPM project and to create the BPM artifacts are stored in a text file according to a standard RMI format.

If project generating program 110 determines that the end of artifact list 116 has been reached (decision 440, yes branch), project generating program 110 transfers the generated RMI instructions to a BPM modeling tool, via an RMI interface, at step 450. The BPM modeling tool is then able to process the RMI instructions and automatically create a new BPM project including the identified BPM artifacts. For example, for a process involving invoice processing, an RMI instruction set would contain commands to create a skeleton project structure. Subsequent commands would include instructions to create a 'receive invoice' activity, a 'check invoice' activity and a 'pay invoice' activity. These created activities are linked to the skeleton project. On receipt of the commands the BPM tool would process the instructions and create a project with the three activities required to fulfill the process. This project is then made available to the user to enhance.

Figure 5:
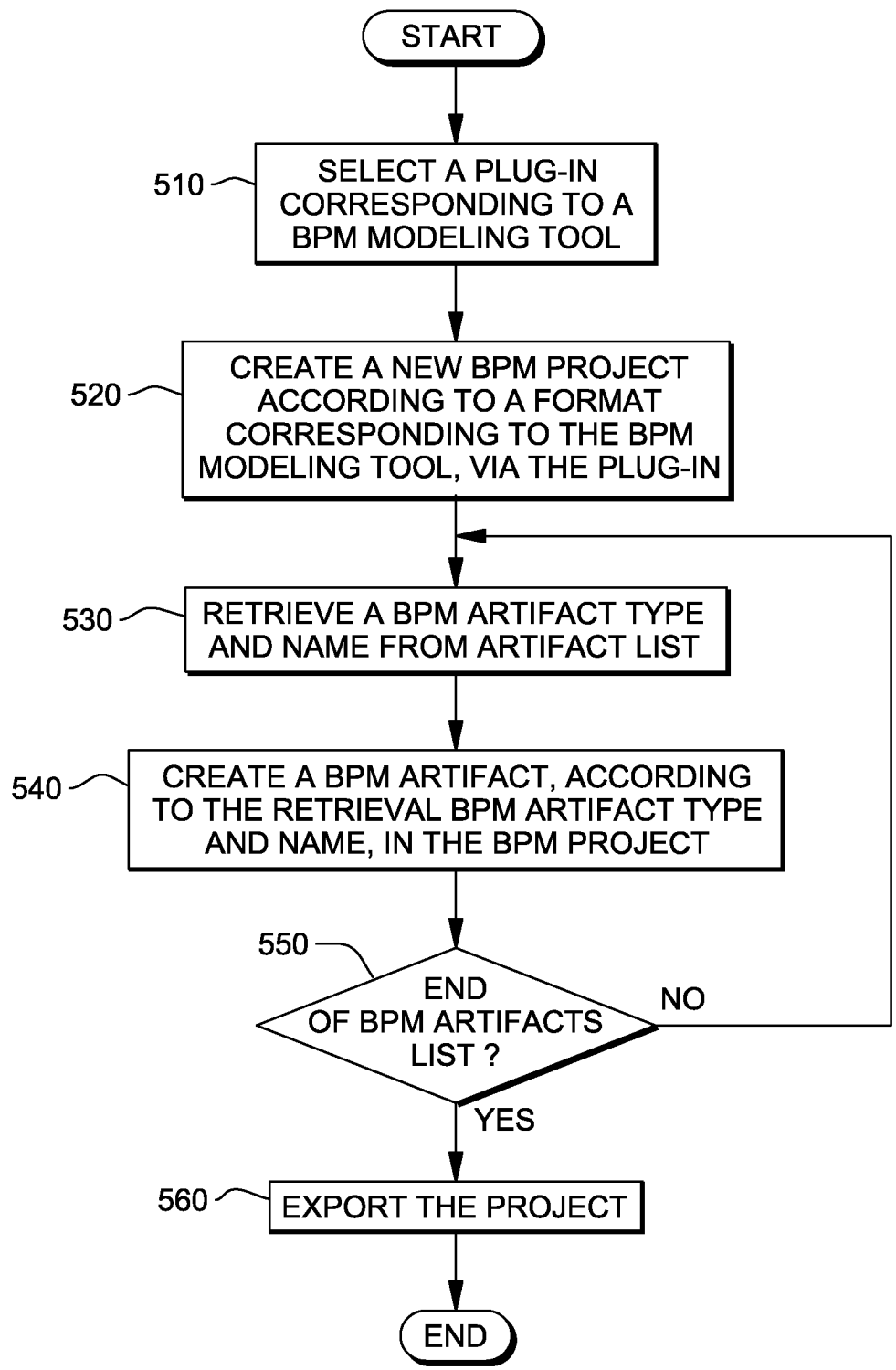
FIG. 5 illustrates in more detail the steps performed by a project generating program of the computer system of FIG. 1 for generating a business process model project, including generated business process model artifacts, according to another embodiment of the present invention.

FIG. 5 illustrates in more detail the steps performed by the project generating program 110 of FIG. 1 for generating a BPM project, including the identified BPM artifacts, according to another embodiment of the present invention. Specifically, FIG. 5 illustrates a flow chart of the project generating program 110 of FIG. 1 for generating a BPM project via a plug-in. A plug-in allows a first application to interact with a second application by providing an interface between the two applications.

At step 510, project generating program 110 selects a plug-in corresponding to a selected BPM modeling tool. Different BPM tools require different plug-ins for accessing the functionality of the BPM tool. For example, a user may choose to model a business process using Process Intelligence for SAP from IDS Scheer. Accordingly, project generating program 110 may select a plug-in provided by IDS Scheer for accessing the functionality of Process Intelligence for SAP application.

At step 520, project program 110 creates a new BPM project according to a format specified by a selected BPM tool, via the plug-in. For example, project generating program 110 defines the skeleton structure of a BPM project, by using known project guidelines specific by the selected BPM tool. The defined skeleton structure of the BPM project contains default artifacts that are required to create a new process, as well as additional artifact folders for storing automatically generated custom artifacts. For example, the BPM project may contain folders identified as 'Auto-Activities', 'Auto-Resources', and 'Auto-Decisions'. This would allow a user to quickly locate any automatically defined artifacts as opposed to any new artifacts that have been created manually.

At step 530, project generating program 110 retrieves a BPM artifact type and name pair from artifact list 116. At step 540, project generating program 110 creates a BPM artifact, according to the retrieved BPM artifact type and name pair, in the new BPM project. For example, a BPM artifact type and name pair is defined within the project as a business artifact using an artifact generating protocol defined by the selected BPM modeling tool. Artifacts determined to be activity artifacts are placed into the 'Auto-Activity' folder within the skeleton project. Artifacts determined to be resource artifacts are placed into the 'Auto-Resource' folder within the skeleton project. Artifacts determined to be decision artifacts are placed into the 'Auto-Decision' folder within the skeleton project. This allows a user quick access to all automatically generated artifacts.

At step 550, project generating program 110 determines whether the end of artifact list 116 has been reached. If project generating program 110 determines that the end of artifact list 116 has not yet been reached (decision 550, no branch), project generating program 110 retrieves the next BPM artifact type and name pair at step 530, and repeats the process described until all BPM artifact type and name pairs in BPM artifact list 116 have been processed.

If project generating program 110 determines that the end of artifact list 116 has been reached (decision 550, yes branch), then project generating program 110 exports the new project as a project shell, at step 560. A user may later open the new project shell using the selected BPM tool and begin to model a business process, using the already defined BPM artifacts, without having to manually create the BPM artifacts.

Figure 6:
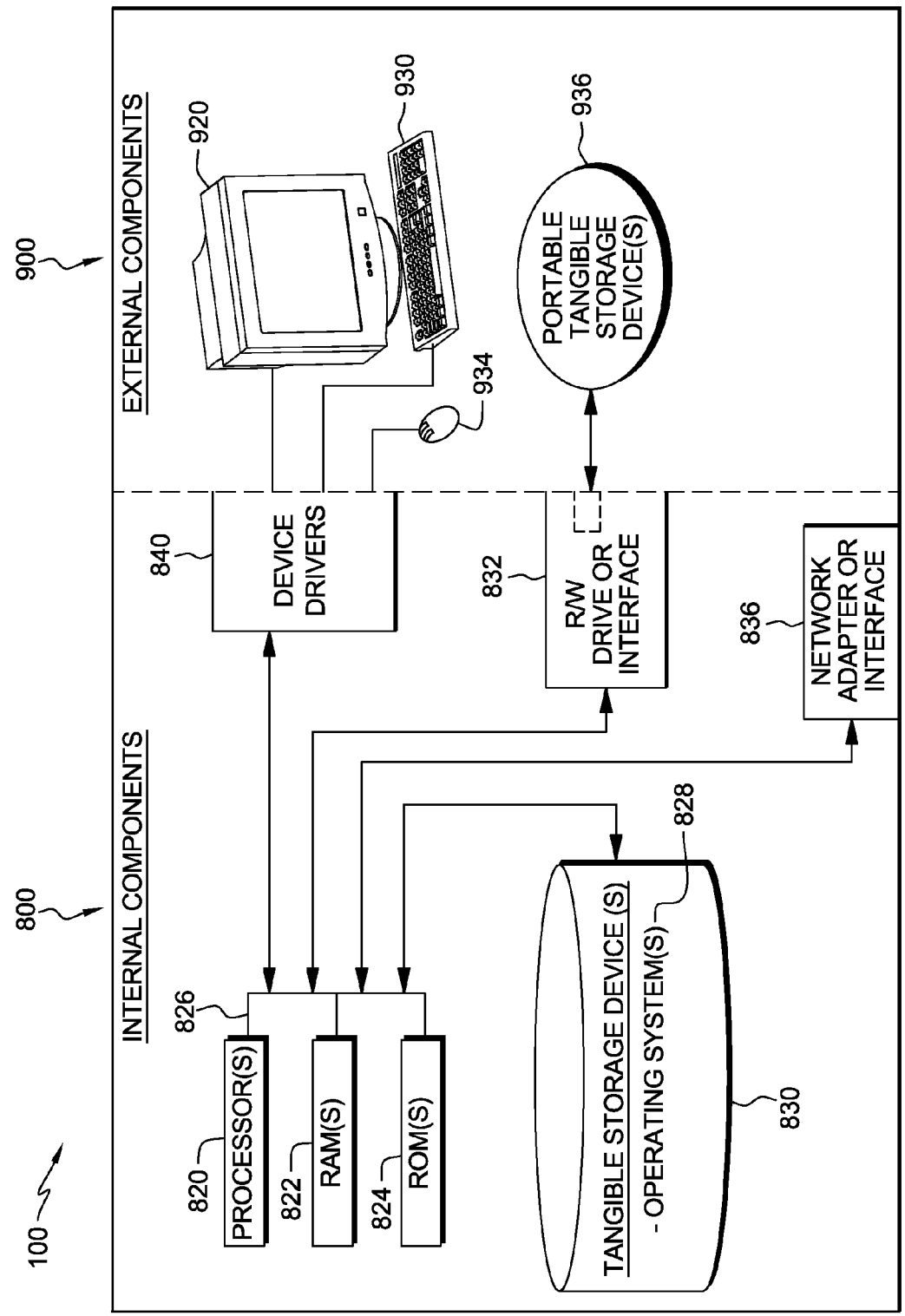
FIG. 6 illustrates hardware and software components of the computer system of FIG. 1.

FIG. 6 illustrates hardware and software components of computer system 100 of FIG. 1. Computer system 100 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828, document searching program 102, artifact identification program 108, and project generating program 110 are stored on one or more of the computer-readable tangible storage devices 830 for execution by one or more of the processors 820 via one or more of the RAMs 822 (which typically include cache memory). Search pattern data table 106 is also stored on one or more computer-readable tangible storage devices 830. In the embodiment illustrated in FIG. 6 each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The document searching program 102, artifact identification program 108, and project generating program 110 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The document searching program 102, artifact identification program 108, and project generating program 110 can be downloaded to computer system 100 from an external computer via a network (for example, the Internet, a local area network or other, wide area network) and network adapter or interface 836. From the network adapter or interface 836, the document searching program 102, artifact identification program 108, and project generating program 110 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Document searching program 102, artifact identification program 108, and project generating program 110 can be written in various programming languages including low-level, high-level, object-oriented or non object-oriented languages. Alternatively, the functions of document searching program 102, artifact program 108, and project generating program 110 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for generating a business process model project, the method comprising the steps of:
   a computer receiving a data file comprising text descriptive of a business process;
   the computer searching a sentence in the text for a keyword indicating a type of a business process model artifact, wherein a name of the business process model artifact exists in the sentence;
   in response to identifying the keyword, the computer identifying the name of the business process model artifact by parsing the sentence according to a predefined search pattern;
   the computer adding the name of the business process model artifact and the type of the business process model artifact to a business process model artifact list; and
   the computer generating a business process model project shell based in part on the business process model artifact list.

2. The method of claim 1, wherein the type of business process model artifact comprises one of activity artifact, decision artifact, and resource artifact.

3. A computer system for generating a business process model project, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to receive a data file comprising text descriptive of a business process;
   program instructions to search a sentence in the text for a keyword indicating a type of a business process model artifact, wherein a name of the business process model artifact exists in the sentence;
   in response to identifying the keyword, the computer identifying the name of the business process model artifact by parsing the sentence according to a predefined search pattern;
   program instructions to add the name of the business process model artifact and the type of the business process model artifact to a business process model artifact list; and
   program instructions to generate a business process model project shell based in part on the business process model artifact list.

4. The computer system of claim 3, wherein the type of business process model artifact comprises one of activity artifact, decision artifact, and resource artifact.

5. A computer program product for generating a business process model project, the computer program product comprising:
   one or more computer-readable tangible storage devices and program instructions stored on at least one of the one or more storage devices, the program instructions comprising:
   program instructions to receive a data file comprising text descriptive of a business process;
   program instructions to search a sentence in the text for a keyword indicating a type of a business process model artifact, wherein a name of the business process model artifact exists in the sentence;
   in response to identifying the keyword, the computer identifying the name of the business process model artifact by parsing the sentence according to a predefined search pattern;
   program instructions to add the name of the business process model artifact and the type of the business process model artifact to a business process model artifact list; and
   program instructions to generate a business process model project shell based in part on the business process model artifact list.

6. The computer program product of claim 5, wherein the type of business process model artifact comprises one of activity artifact, decision artifact, and resource artifact.

* * * * *